United States Patent [19]
Mills et al.

[11] Patent Number: 5,960,816
[45] Date of Patent: Oct. 5, 1999

[54] ADJUSTABLE LENGTH VENT VALVE SYSTEM FOR FUEL TANKS

[75] Inventors: Vaughn Mills, Chelsea; Rudolph Bergsma, Ann Arbor; Lindsey E. Waldorf, Whitmore Lake; Robert P. Benjey, Dexter, all of Mich.

[73] Assignee: G.T. Products, Inc., Ann Arbor, Mich.

[21] Appl. No.: 08/824,324

[22] Filed: Mar. 26, 1997

[51] Int. Cl.⁶ .................................................. F16K 24/04
[52] U.S. Cl. ............................................. 137/202; 137/43
[58] Field of Search ....................................... 137/43, 202

[56] References Cited

U.S. PATENT DOCUMENTS

| | | | |
|---|---|---|---|
| 1,667,877 | 5/1928 | Star | 137/202 |
| 2,725,071 | 11/1955 | McKillop | 137/202 |
| 2,812,772 | 11/1957 | Moore | 137/202 |
| 4,989,629 | 2/1991 | Shirakawa | 137/202 |
| 5,277,217 | 1/1994 | Kobayashi et al. | 137/202 X |
| 5,404,907 | 4/1995 | Benjey et al. | 137/43 X |
| 5,439,023 | 8/1995 | Horikawa | 137/202 |
| 5,529,086 | 6/1996 | Kasugai et al. | 137/202 |
| 5,582,198 | 12/1996 | Nagino et al. | 137/202 |
| 5,590,697 | 1/1997 | Benjey et al. | 137/202 X |
| 5,605,175 | 2/1997 | Bergsma et al. | 137/202 |
| 5,678,590 | 10/1997 | Kasugai et al. | 137/202 |
| 5,687,756 | 11/1997 | VanNatta et al. | 137/202 |

*Primary Examiner*—Gerald A. Michalsky
*Attorney, Agent, or Firm*—Young & Basile, P.C.

[57] ABSTRACT

A fuel level responsive vent valve assembly adaptable to a variety of different mounting requirements in a vehicle fuel tank. In general, the vent valve assembly comprises a standard, valve body, a top cover adapted to mate with the standard valve body at a vent outlet interface for a sealed vapor venting connection, and separately formed longitudinal connector means having a preassembly end for preassembly to a standard interface on the lower surface of the top cover, and an assembly end for longitudinally locking the standard valve body to the top cover. The standard assembly end of the longitudinal connectors can be varied in length to accommodate different valve height mounting requirements in different fuel tank applications. In a preferred embodiment the longitudinal connectors comprise metal pins or rods which can be pre-formed or cut to length to accommodate the standard valve body at different distances from the top cover. In addition to providing a longitudinal lock between the valve body and the top cover, the connector pins also provide an impact-resistant reinforcement to the sealed connection at the vent outlet interface.

13 Claims, 10 Drawing Sheets

ADJUSTABLE LENGTH VENT VALVE SYSTEM FOR FUEL TANKS

FIELD OF THE INVENTION

This invention is in the field of vent valves for automobile fuel tanks, and more particularly to fuel level responsive valves.

BACKGROUND OF THE INVENTION

Fuel level responsive vent valves are well known for use in automobile fuel tanks, located in the tank to remain open when the fuel is below a certain level, and to close when the fuel reaches the valve. Two common applications of these valves are "rollover" valves, which respond to abnormal fuel levels or unusual vehicle angles to close a vapor outlet from the tank, and fuel shutoff or "fill control" valves which are positioned to close when the fuel tank reaches the "full" level during refueling.

Depending on known factors such as the valve's intended application, the size and shape of the fuel tank, and the desired "full" or "rollover" fuel level, the height of the valve in the fuel tank (or distance the valve is spaced from the top wall) will vary. For example, two different car models with two different fuel tanks might require the same valve mechanism, but located at different heights in the respective tank.

Additionally, fuel level responsive vent valves are now commonly supported from the top wall of the fuel tank by a job-specific cover or cap which can be attached to the top in a sealing fashion such as with a grommet or bayonet mount or by welding to the outside of the fuel tank wall. The top cover is typically preassembled to the main valve body, and the valve body is inserted through a hole in the top wall of the fuel tank until the top cover contacts the tank's upper surface where it is locked or welded in place.

The top cover and the main valve are often made from different types of plastics, for example relatively soft, weldable polyethylene (PE) for the top cover and relatively rigid, non-weldable nylon for the valve body. The interface between these different materials must be sealed to prevent vapor and fluid leaks, and must remain sealed throughout the fluctuating temperature and vapor pressure conditions of the fuel tank over the life of the valve. The different materials, however, often respond differently to the same environmental conditions in the tank, for example with the portions of the top cover in the tank tending to grow or "creep" in length. This can affect the integrity of the seal between these two main parts of the valve assembly.

It may also be necessary to attach the same type of valve body to different types of top covers with different manners of attachment to the fuel tank.

It is also desirable to make the sealing interface or connection between the non-weldable valve body and the weldable top cover as impact-resistant as possible to maintain the integrity of the sealing fit therebetween.

SUMMARY OF THE INVENTION

It is an object of the invention to enable a standardized valve body to be coupled with a variety of job-specific top covers, and to be supported at varying distances from the top wall of the fuel tank, using a standardized connection for attaching the valve to a cover.

In general the invention is achieved with a fuel level responsive vent valve assembly including a standard valve body with a fuel level responsive valve means and a vent outlet; a top cover including a vent outlet interface portion and a standard preassembly interface; and a separately formed longitudinal connector for longitudinally locking the valve body to the top cover independently of the vent outlet interface. The longitudinal connector, which can be formed in different lengths for different valve mounting applications, has a standard preassembly end for connection to the standard preassembly interface on the top cover, and a standard assembly end for connection to a standard assembly portion on the valve body.

In one illustrated and preferred form, the longitudinal connector comprises a pair of connector pins, preferably metal, with push-to-fit insertion ends engaging the standard preassembly interface on the top cover. The opposite ends slide into mating receptacles or channels in the valve body and are locked in place with a simple mechanical attachment, for example a Tinnerman type clip. In an alternate embodiment of the longitudinal connector, the connector is a molded plastic piece which mates with the preassembly interface of the top cover and which has a pair of longitudinal legs for mating with an exterior portion of the valve body.

In a further preferred and illustrated form the top cover is a weldable type for welding to a polymer fuel tank, and the valve body is made from a fuel-resistant non-weldable material.

These and other features and advantages of the invention will become apparent upon a further reading of the specification.

DETAILED DESCRIPTION OF THE PREFERRED EMBODIMENTS

Figure 1:
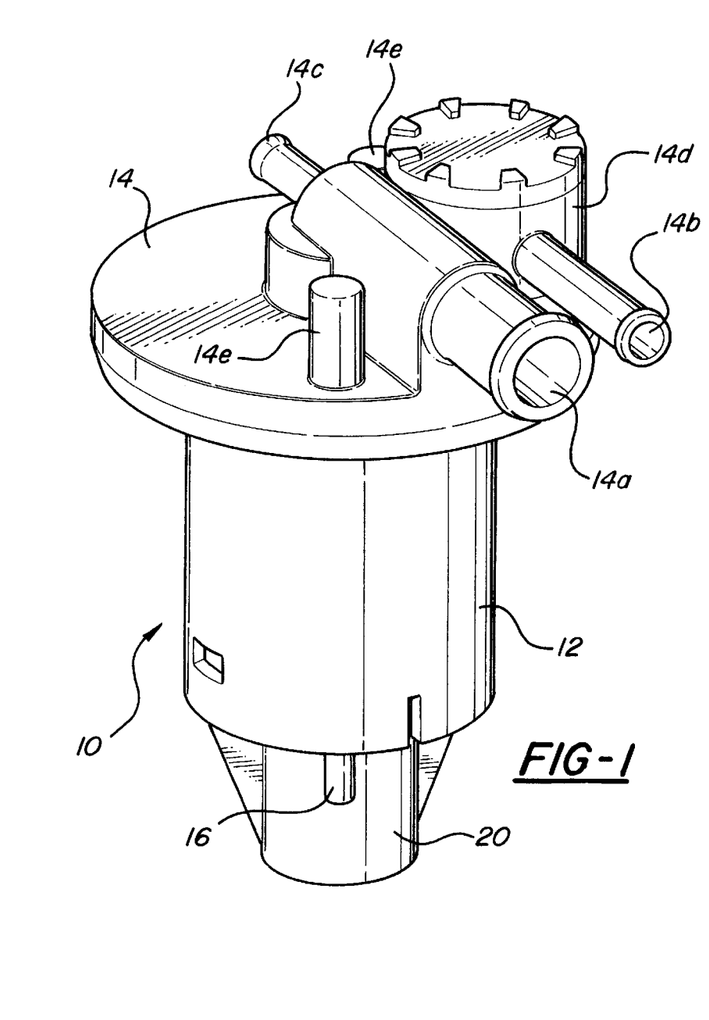
FIG. 1 is a perspective view of a "short" version of the inventive valve assembly.
Figure 2:
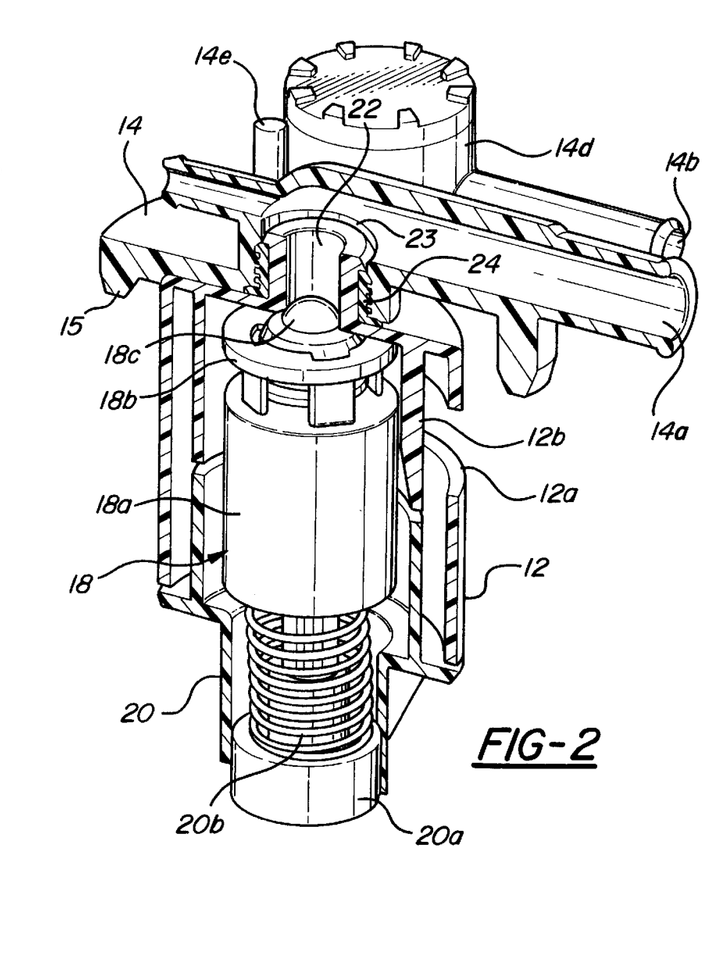
FIG. 2 is a partial cut away view of the valve assembly of FIG. 1.
Figure 3:
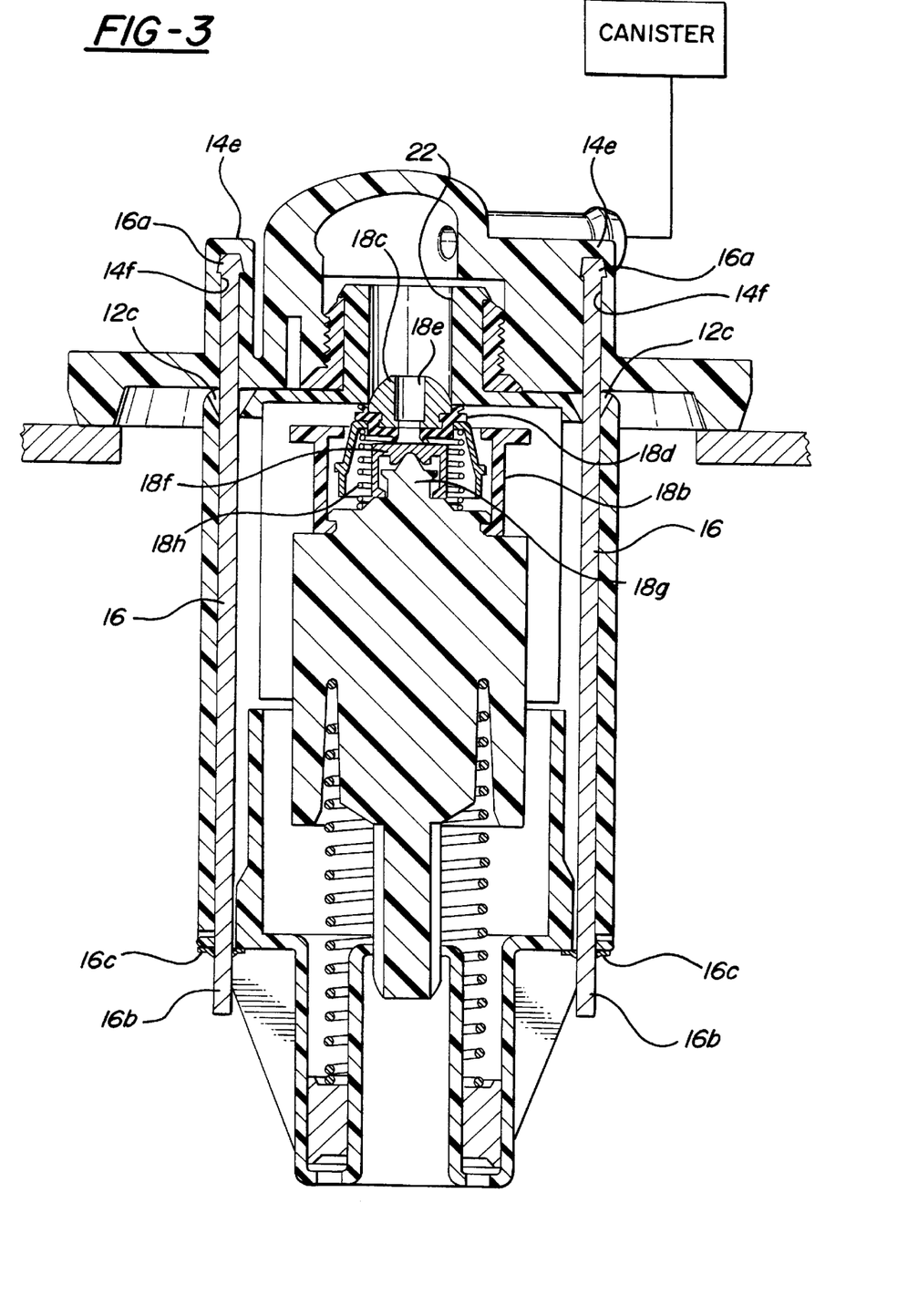
FIG. 3 is a side section view of the valve assembly of FIG. 1.

FIGS. 1–3 illustrate one embodiment of a "short" version of the inventive valve assembly for use in fuel tanks where the valve mechanism would be located near the top wall of the fuel tank, allowing a higher fuel level before valve closure. The illustrated embodiment shows a fuel shut-off valve for controlling onboard vapor recovery between the fuel tank and a vapor canister, as best illustrated in FIG. 3. The general operation of onboard vapor recovery fuel shut-off valves is well known to those skilled in the art, and needs no further explanation here.

The valve assembly of the present invention lends itself to adapting a standardized valve body to a wide variety of fuel tank height requirements and venting combinations, using three basic parts: a main valve body 12, standardized for all anticipated uses; job-specific top cover 14 which defines a sealed vent outlet interface with main valve body 12 and secures assembly 10 to the top wall of a fuel tank; and, one or more longitudinal connectors 16 which mechanically lock the main valve body 12 to the top cover 14 independent of the vent outlet interface between valve 12 and cover 14.

The main valve body 12 is standardized and can be used in different fuel tanks, at different heights for shut-off control in response to fuel level. The top cover 14 may have job-specific external structure on its upper surface for different venting arrangements or tank attachment methods, but has a standardized preassembly interface for the separately formed connectors 16 on its lower or interior surface. Connectors 16 are also standardized at their upper ends for connection to the standardized lower portions of the top cover, and will vary from one application to another, if at all, only in overall length to accommodate different valve mounting heights.

Still referring to the illustrated example of FIGS. 1–3, a currently preferred embodiment of the invention is intended for use with "weldable" type fuel tanks made from materials such as high-density polyethylene. Accordingly, main valve body 12 is preferably formed from a "non-weldable" (to the tank), relatively hard plastic such as nylon, which exhibits resistance to expansion and "creep" due to the welding heat and fuel vapor generated in the fuel tank. Top cover 14 is preferably formed from a weldable, relatively soft, flexible polymer such as high-density polyethylene to make it weld-compatible with plastic fuel tanks, to provide a good fit with the main valve body at the vent outlet interface, and for ease in molding the upper surface into different job-specific venting configurations. In the illustrated embodiment, top cover 14 is shown with vapor outlet connector portions 14a, 14b, 14c, an overpressure relief valve housing 14d, and connector interface portions 14e described in further detail below.

Connectors 16 are illustrated as cylindrical steel rods or pins inserted into the connector interface portions 14e on the top cover and extending down through appropriate grooves or channels formed in main valve body 12. The lower ends of connectors 16 are simply formed to length or cut off below valve body 12 at a convenient height. In the illustrated embodiment, valve body 12 is capped off at its lower end by lower housing 20, which contains an adjustable float calibration plate mechanism 20a, disclosed in detail in co-pending U.S. patent application Ser. No. 08/728,351, filed Oct. 9, 1996, now abandoned, and owned by the assignee of this application.

The internal valve mechanism in main valve body 12 comprises a fuel level responsive float 18a, a primary valve cage 18b on the upper end of the float, and a primary valve element 18c with a limited range of spring-biased motion inside the cage. Valve element 18c is operated by the float to open and close a vent outlet 22 for selective fuel vapor venting from the tank through port 14a to the vapor canister. Valve body 12 includes a port or window 12a in its sidewall to allow vapor venting in the valve-open condition, and to allow liquid fuel to enter the interior of the valve body and raise float 12 to the closed position shown in FIG. 2. Vent outlet 22 is protected from fuel splash-through when the valve element 18c is open by an internal baffle 12b roughly coextensive with window 12a. Fuel entry into the valve to raise float 18a may be assisted by other ports, for example in the end cap structure 20.

The interface between vent outlet 22 and top cover 14 is a sealed connection, in the short version of FIGS. 1–3 sealed by a resilient ring-shaped member 24 which fits snugly around the vent outlet and engages a mating interface portion 23 on the top cover in a push- or plug-type fit.

The sealed connection between valve body 12 and top cover 14 at the vent outlet interface is preferably firm, with a tight friction fit, but does not provide a permanent locking connection between the valve body and top cover. Such a locking connection is provided by separately formed connector structure such as illustrated pins 16, best shown in FIG. 3. Connector pins 16 are preferably formed from metal, such as stainless steel, and include upper ends 16a shaped to lock into the connector interface portions 14e on the top cover. Lower ends 16b mate with the valve body and are formed or cut off at a convenient length, requiring no special shape. Pins 16 could alternately be formed from a plastic of suitable properties, or take non-cylindrical shapes.

It will be apparent to those skilled in the art that connector pins 16 can be cut to the appropriate length from a continuous, standard wire stock, and upper ends 16a formed to any desired shape, such as the semi-barbed head illustrated in FIG. 3. Alternately, pins 16 could have threaded upper ends or other connecting structure to longitudinally lock them to cover 14. The pins may also be inserted directly into the housing 14 as shown or into inserts in housing 14.

Connector pins 16 are preassembled to the top cover 14 by inserting barbed heads 16a into roughly cylindrical channels 14f formed in connector interface portions 14e. The barbed heads 16a of the metal connector pins deform the relatively soft plastic of the cover to lock the pins in place when they are fully inserted. It is then a simple matter to insert the lower ends 16b of the connector pins through suitable openings or through-channels 12c formed in the main valve body 12. When the main valve body 12 has been fully assembled to the preassembled cover/connector combination, with the sealed connection made between the vent outlet 22 and the cover's interface, the lower ends 16b of the connector pins protrude through openings at the lower end of the main valve body so that the valve body can be locked in place, preferably with a mechanical fastener, for example the illustrated Tinnerman-type clip 16c.

Referring specifically to FIG. 3, the inventive valve assembly is illustrated incorporating an improved two-stage valve mechanism. Specifically, the valve structure at the upper end of float 18 includes a primary valve element 18c with an insert-molded resilient seal member 18d to form a seal around the perimeter of vent outlet 22. The primary valve element 18c and seal member 18d are formed with a secondary vapor venting passage 18e which extends through both to the interior of primary valve cage 18b and communicates with the interior of valve body 12 via one or more holes formed in the lower cup-shaped portion of the primary valve element and through the clearance maintained between the bottom edge of primary valve element 18c and float 18a. The lower end of secondary venting passage 18e is selectively opened and closed by a multi-legged secondary valve element 18f which is trapped on a pilot portion 18g of the float for limited up and down movement within primary valve cage 18b.

Primary valve element 18c is biased upwardly within valve cage 18b by a spring 18h abutting an interior surface of the lower cup-shaped portion of valve element 18c to force it upwardly against the internal shoulder illustrated at the top of valve cage 18b. Secondary valve element 18f is not spring biased, and normally rests on float pilot 18g.

Referring to FIGS. 9–12, the operation of the two-stage valve mechanism from fully closed to fully open is illustrated in detail.

Figure 9:
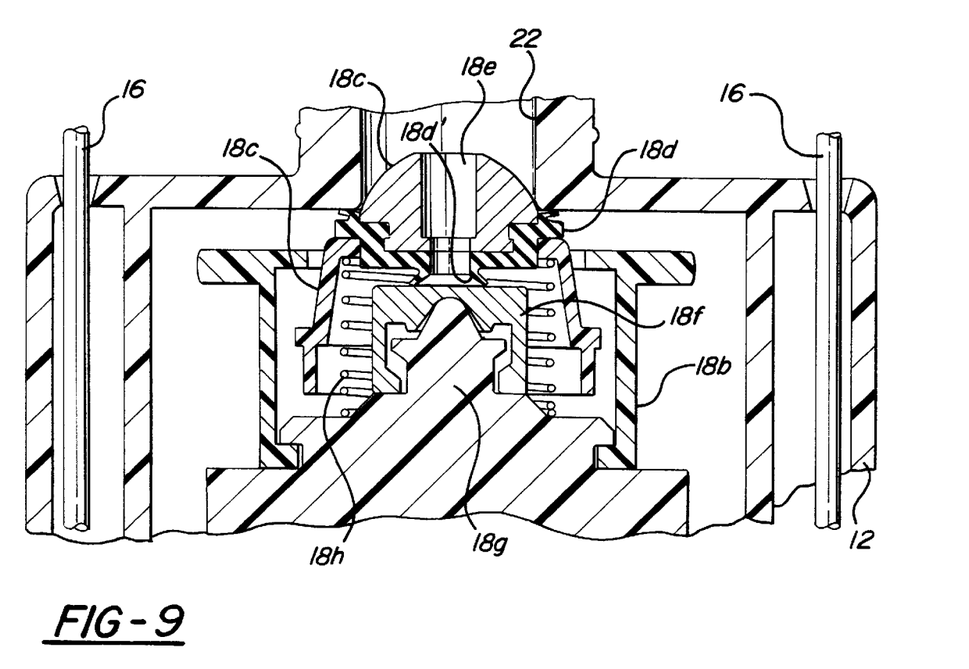
FIG. 9 is a detailed view of the valve mechanism and valve seat region in the valve body shown in the preceding figures, shown in the fully closed position.

FIG. 9 shows the valve mechanism in the fully closed position, in which the primary valve element 18c and its built-in resilient seal portion 18d have been forced in a first stage into sealing contact with vent outlet 22, and subsequently forced in a second stage down against the bias of spring 18h within valve cage 18b so that lower lip-type portion 18d' of the resilient seal is forced against secondary valve element 18f, thereby closing all vapor flow from the fuel tank through vent outlet 22. Between the first and second stages vapor flow continues through passage 18e.

Figure 10:
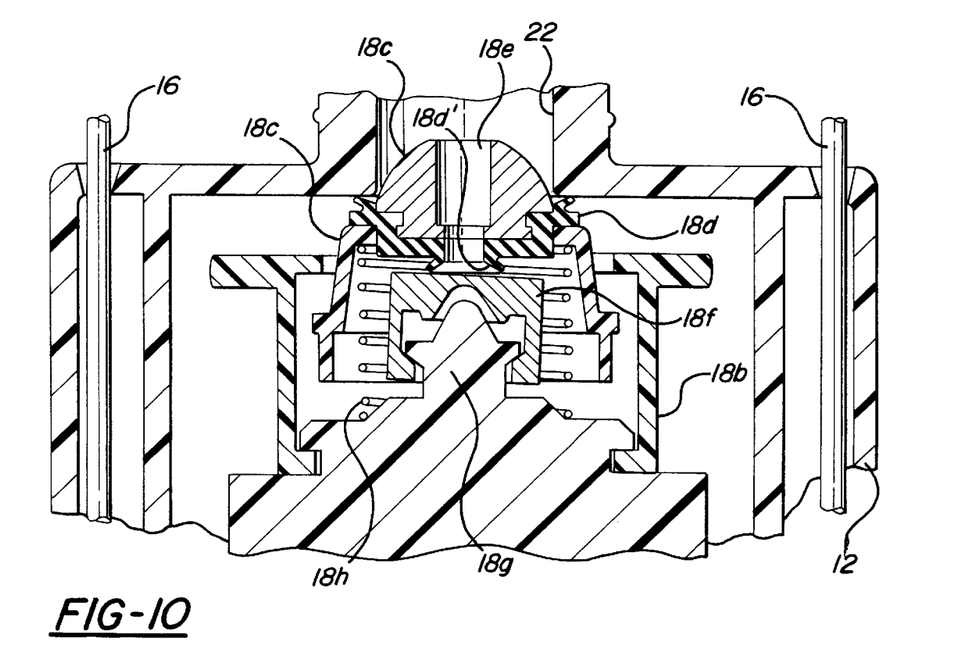
FIG. 10 illustrates the valve mechanism of FIG. 9 as its secondary stage begins to open when the fuel level drops.

FIG. 10 illustrates the valve in an initial opening stage where the secondary valve element 18f has been "cracked" or partially peeled free on one side from the secondary lower seal portion of the resilient member 18d to permit secondary vapor venting through port 18e, thereby reducing the pressure differential tending to hold the primary valve element closed. This partial cracking or peeling action is achieved in the illustrated embodiment by making one of the legs of the secondary valve element 18f (in FIG. 10 the right-hand leg) longer than the others so that pilot portion 18g engages it first when the float descends with the fuel level.

Figure 11:
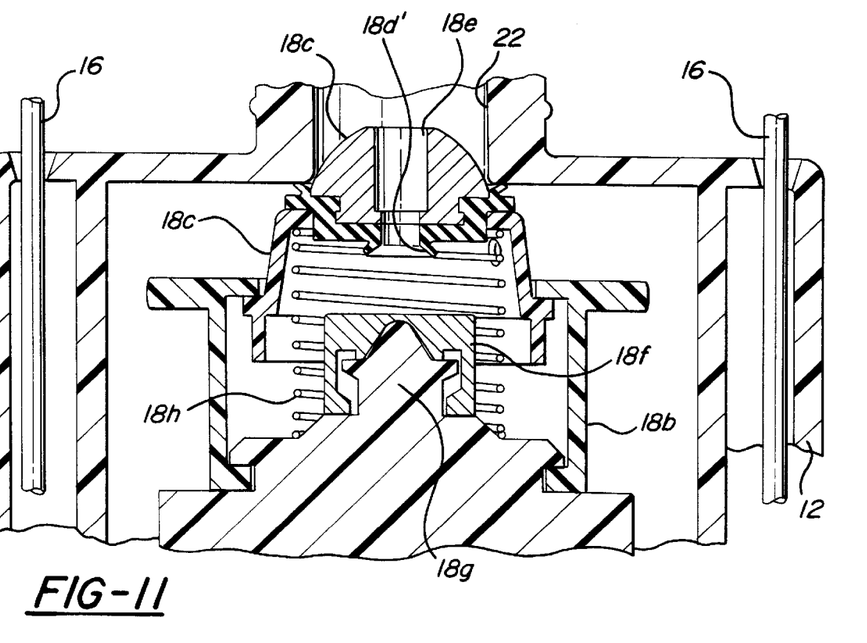
FIG. 11 illustrates the valve mechanism of FIG. 9 after the secondary stage has been opened.

Referring now to FIG. 11, once the secondary valve element 18f has been fully peeled from the secondary seal portion of resilient member 18d, it drops onto pilot 18g. In the meantime, as float 18 continues to drop with fuel level, the internal shoulder portion of the valve cage 18b engage the external shoulder portion on the lower cup-shaped portion of primary valve element 18c to pull it free from vent outlet 22. The pulling action by valve cage 18b can either be a straight pull, or may be a peeling or cracking-type action as described above, by adjusting the relative heights of limited circumferential portions of the valve cage shoulder and the primary valve element shoulder.

Figure 12:
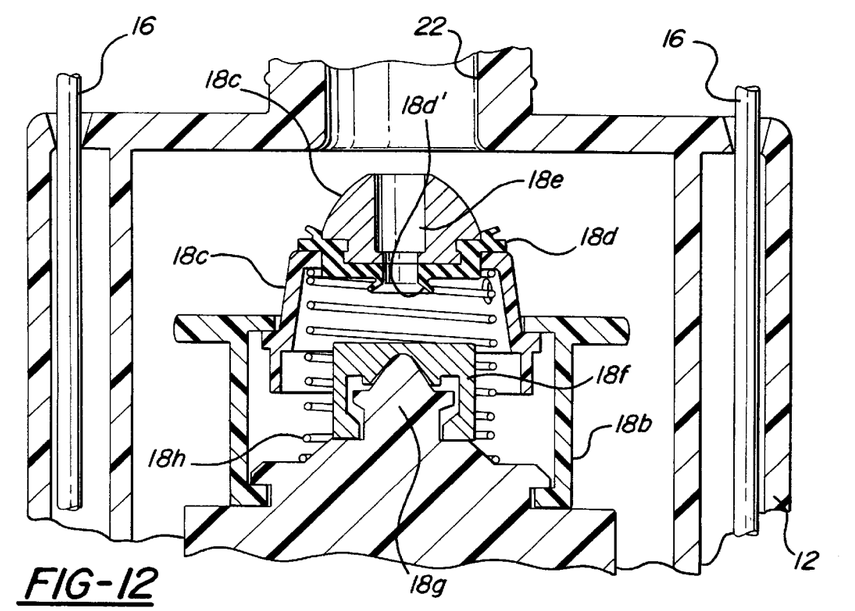
FIG. 12 illustrates the valve mechanism of FIG. 9 in the fully open condition with both secondary and primary stages opened.
Figures 13, 14, 15:
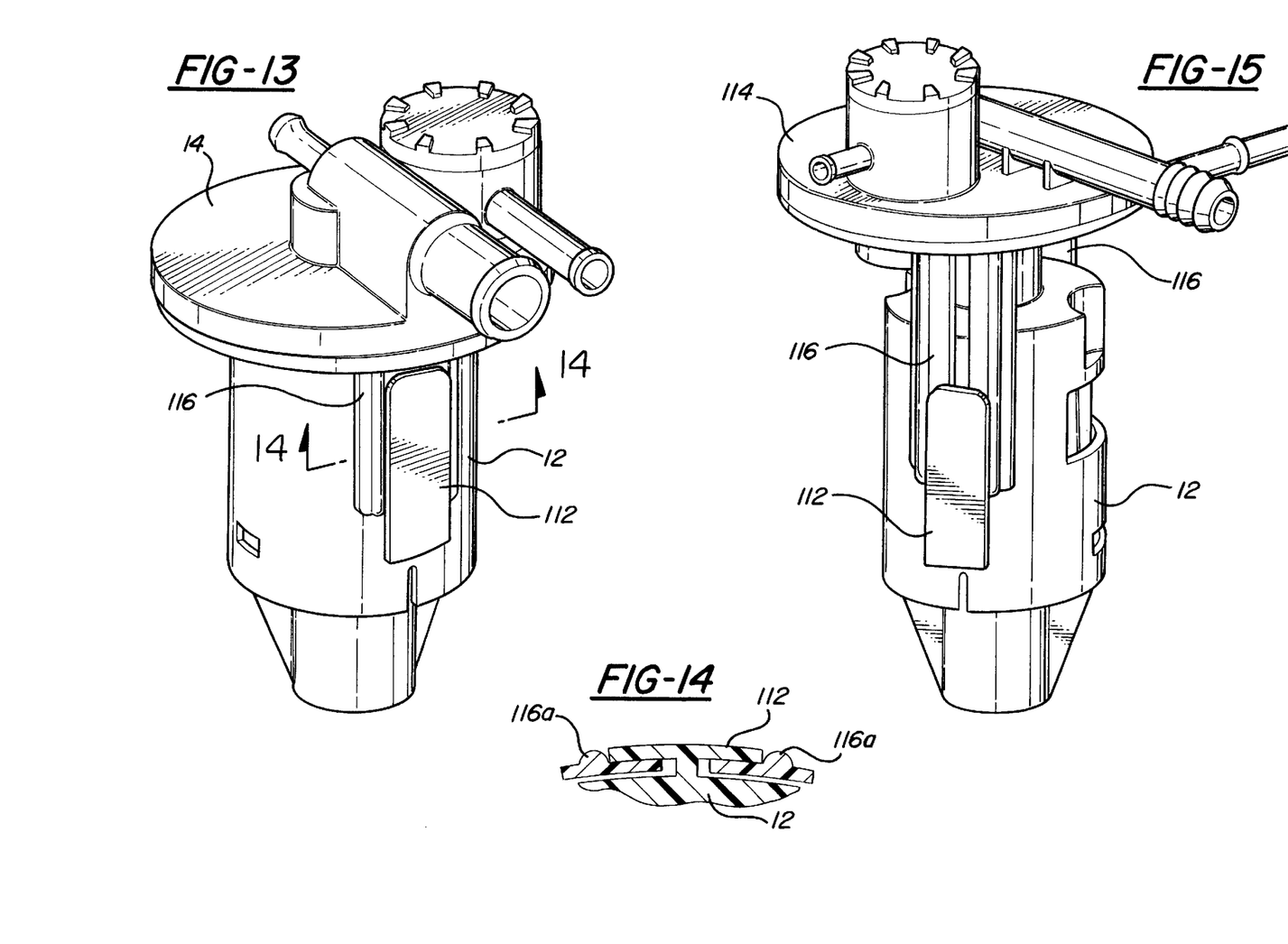
FIG. 13 is a perspective view of an alternate connector for a "short" valve assembly.
FIG. 14 is a top section view of the interlocking connector and valve body structure of FIG. 13.
FIG. 15 is a perspective view of a "long" version of the alternate connector; and, FIG. 16 is an exploded assembly view of the valve components illustrated in FIG. 15.
Figure 16:
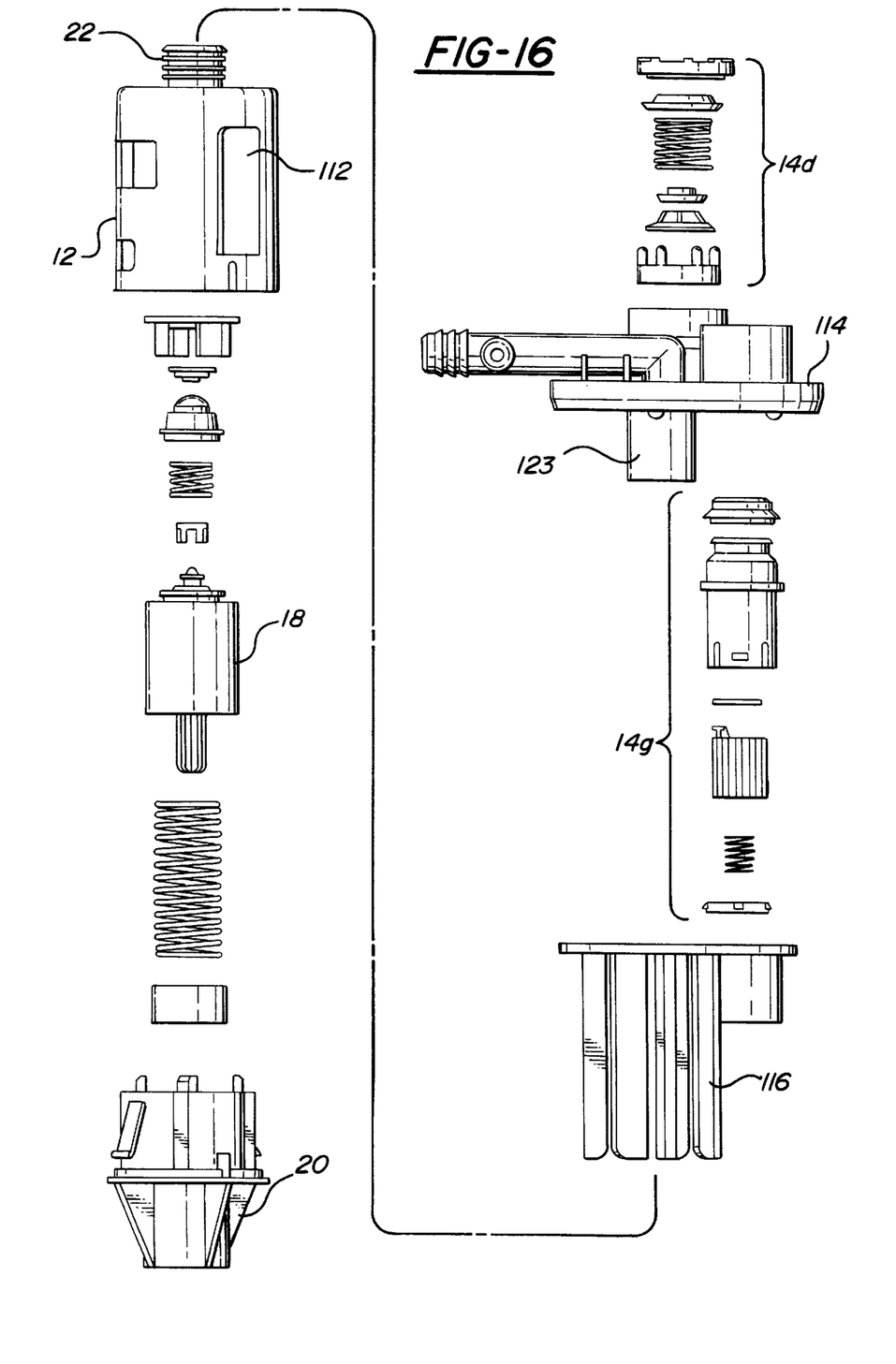

FIG. 12 illustrates the fully open position in which the float has dropped with the fuel level to a point where it has pulled both the primary and secondary valve elements free from vent outlet 22. It will be appreciated that spring 18h assists the downward travel of the float as fuel level drops, helping to overcome any resistance by secondary valve element 18f.

It will also be appreciated by those skilled in the art that the two-stage closing action of the valve mechanism is effectively illustrated in stages beginning with FIG. 12 (fully open), and proceeding in reverse order to FIG. 9 (fully closed). The only difference is that closure of the secondary valve element 18f against passage 18e does not involve the peeling action illustrated in FIG. 10; pilot 18g simply pushes the at-rest secondary valve element into closing contact with passage 18e.

Figure 4:
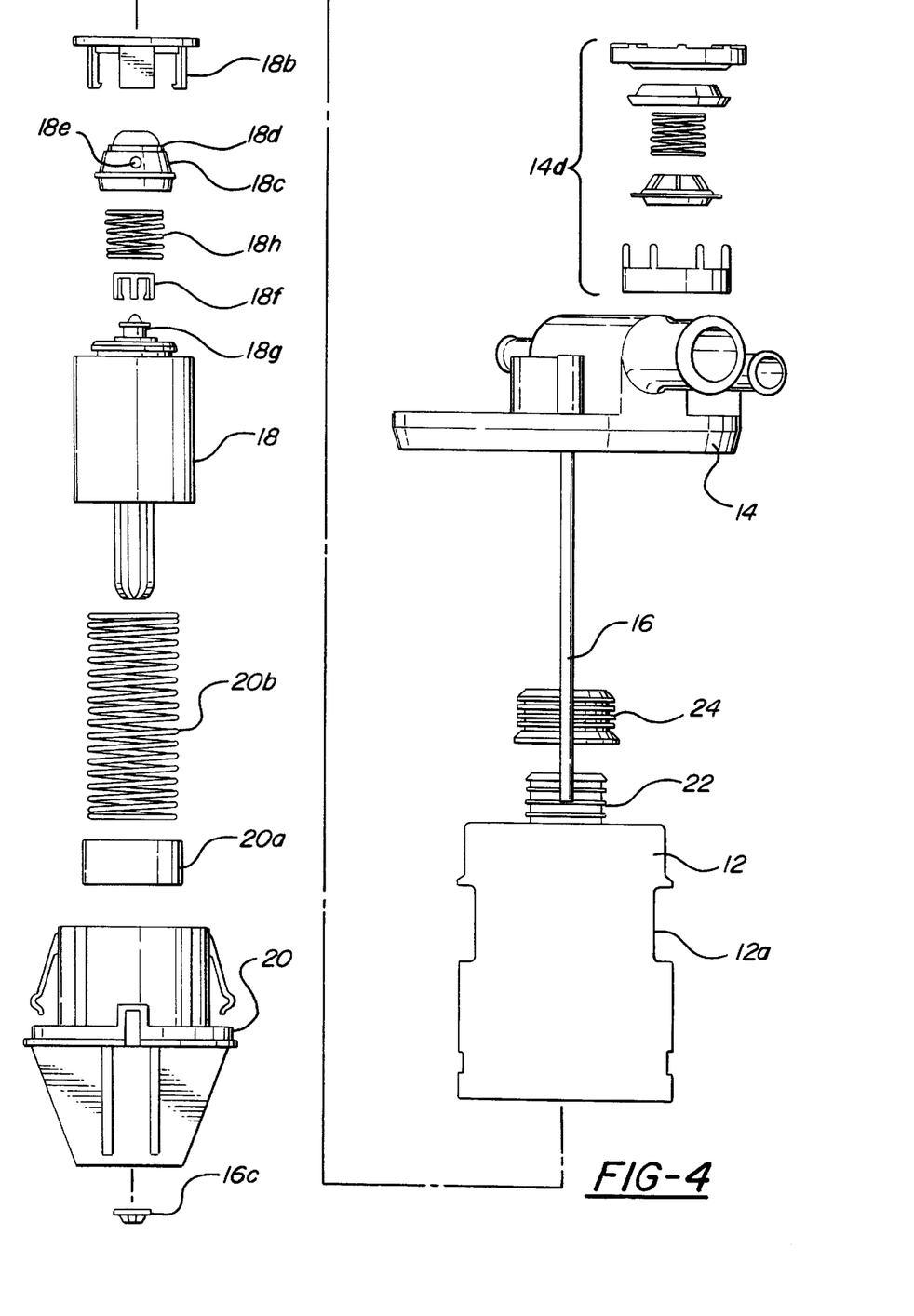
FIG. 4 is an exploded assembly view of the components shown in section in FIG. 3.

FIG. 4 illustrates an exploded assembly view of the parts of the valve assembly illustrated in FIGS. 1–3. In particular, FIG. 4 illustrates the preferred preassembly of connector pins 16 to top cover 14 for subsequent longitudinal sliding assembly of main valve body 12 with the preassembled cover/connector combination. Also illustrated in FIG. 4 are the internal components of the over pressure relief valve contained in valve housing 14d on the cover. The details of this pressure relief valve mechanism are disclosed in the co-pending U.S. patent application referenced above.

Figure 5:
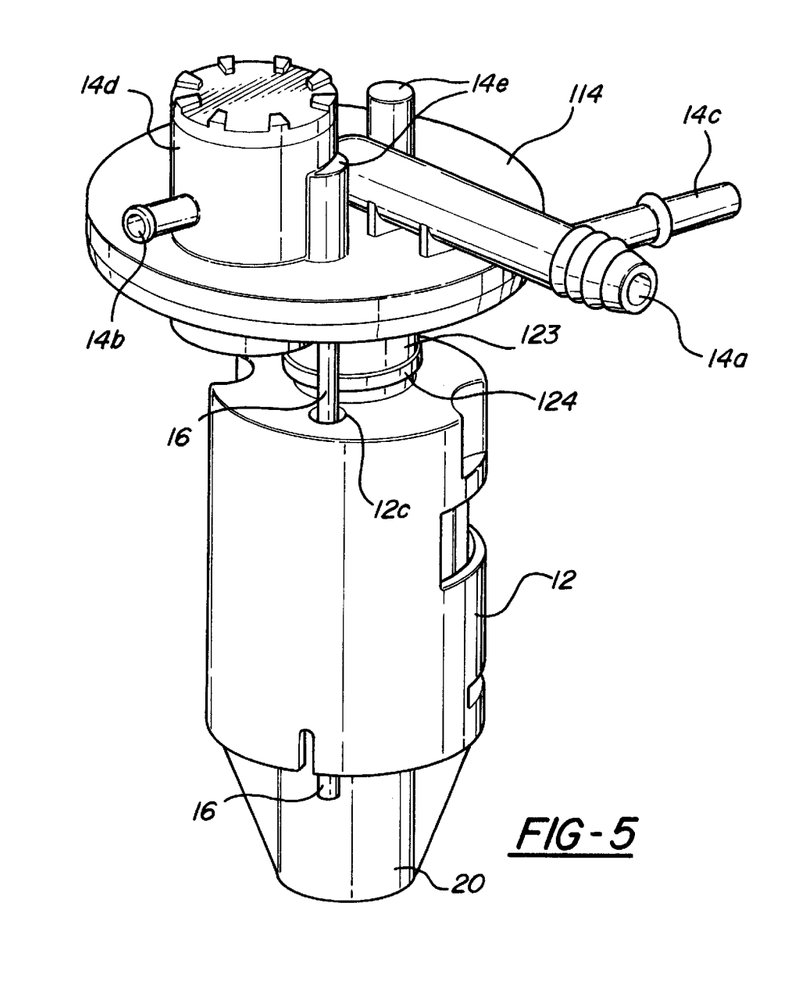
FIG. 5 is a perspective view of a "long" version of the inventive valve assembly.
Figure 6:
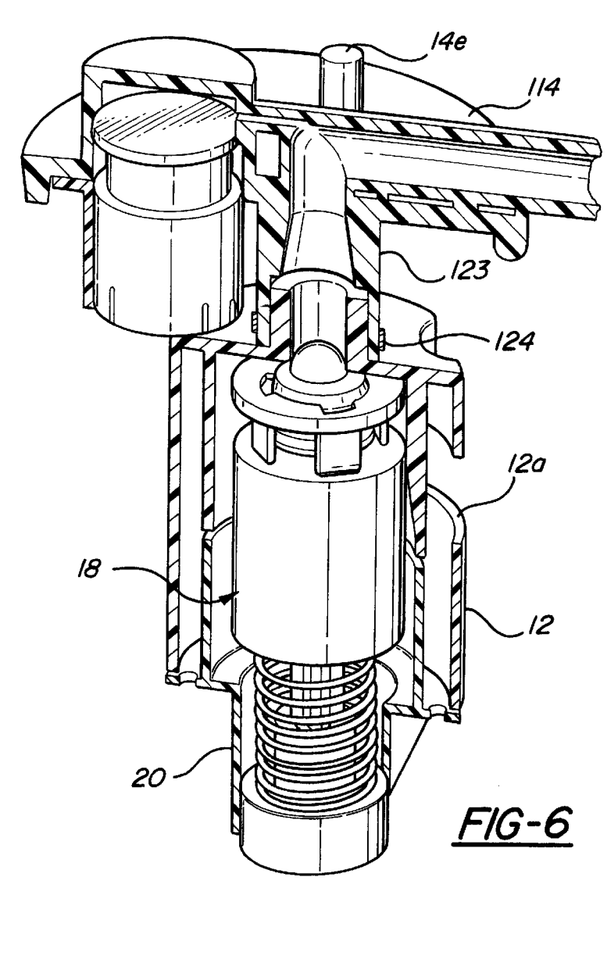
FIG. 6 is a partial cutaway view of the valve assembly of FIG. 5.
Figure 7:
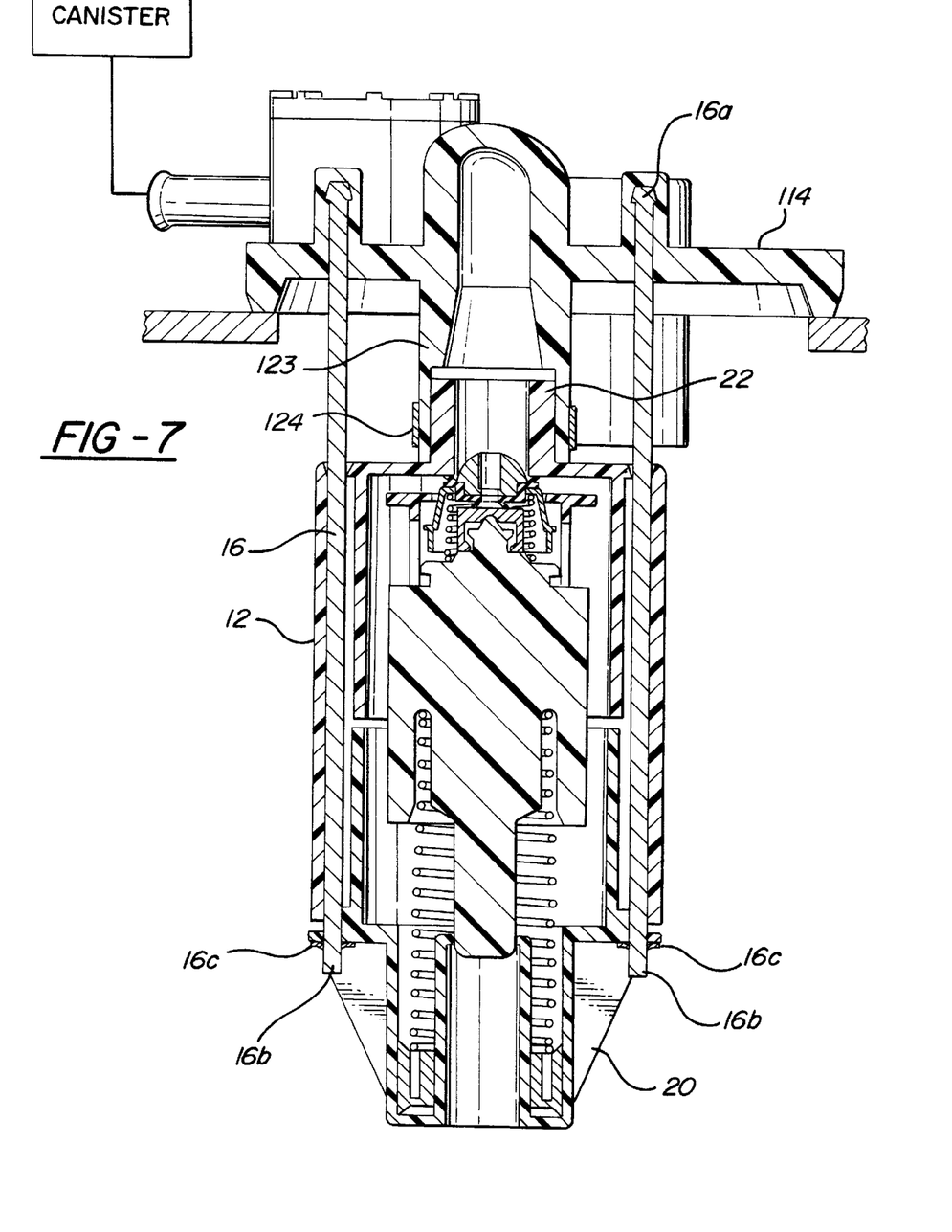
FIG. 7 is a side section view of the valve assembly of FIG. 5.

Referring now to FIGS. 5–7, the invention is illustrated for a "long" version of the valve assembly in which the vent outlet interface portion of the cover and the connector pins 16 have been lengthened to position the standard valve body 12 lower in the tank. The sealed connection at vent outlet interface 123 is shown as a clamp-fit 124. Additionally, modified top cover 114 illustrates a modified connector port arrangement 114a, 114b, 114c.

The primary difference between the "long" valve assembly illustrated in FIGS. 5–7 and the "short" assembly illustrated in FIGS. 1–4 is in the length of the vent outlet interface. The main valve 12 remains identical. It will accordingly be apparent to those skilled in the art that the longitudinal connector pin arrangement is quickly and easily adapted to fit a standard valve body to a variety of fuel tank mounting heights merely by cutting pins 16 to a different length.

Pins 16 may be formed in different lengths to accommodate "long" and "short" valve assemblies or, pins 16 may be formed at a standard "long" length which is sufficient to accommodate the longest anticipated valve assembly for the lowest anticipated valve mounting, such that the excess length for a "short" assembly can either be left in place or clipped to length after the main valve body has been assembled to the cover. This alternate arrangement is illustrated by a comparison of FIGS. 3 and 7, in which the connector pins 16 are of the same length, resulting in a shorter protruding portion 16b in the "long" version of FIG. 7. In fact, this alternate arrangement with a standardized "long" connector pin length may be preferred, as it eliminates any need to supply different lengths of pins for different valve assemblies. It may also be appropriate to place graduated markings or notches on the lower ends of the standard "long" connector pins so that they may be evenly clipped to length when applied to a "short" valve assembly.

A further advantage of the inventive valve assemblies, both short and long versions as illustrated, is the sacrificial bend/or break-away function of longitudinal connector pins 16 with respect to the sealed connection between the main valve body and the cover at the vent outlet interface. Whether a friction-fit, resilient seal-enhanced interface 22, 23, 24 as illustrated in FIGS. 1–3, or the externally clamped direct interface 22, 123, 124 between the soft cover material and the harder vent outlet material shown in FIGS. 5–7, the sealed connection between the two dissimilar materials of the vent outlet is relatively flexible and resistant to breaking or leaking if the main valve body 12 is impacted from the side. However, this interface alone may not be strong enough to maintain the seal between the main valve body 12 and cover 14 at the vent outlet interface. Longitudinal connector pins 16 provide a longitudinal, full-length sacrificial reinforcement for the valve body to mechanically hold it in place. To the extent that pins 16 may be bent or even broken in an impact, they reduce the possibility of separation between the vent outlet and cover at the sealed interface, while the flexible nature of the sealed interface will tend to absorb the reduced deflection forces. Moreover, the positive mechanical lock between the upper ends of the connector pins and the cover, and the lower ends of the connector pins and the valve body, further strengthens the cover's "hold" on the main valve body in case of a side impact to the valve assembly.

Still another advantage of the longitudinal connector pin structure of FIGS. 1–8 is the positional lock which the stable, creep-resistant material of the pins maintains on the main valve body with respect to the sealed vent outlet interface. Environmental conditions in the fuel tank tend to cause the softer, weldable, seal-enhancing material of the top cover at the interface to grow or "creep", often as much as 8–10%. This growth could have a significant effect on the integrity of the seal at its interface with the vent outlet 22, which is a dissimilar, creep-resistant material such as nylon. Connector pins 16a longitudinally lock the main valve body and its vent outlet to the cover interface.

Figure 8:
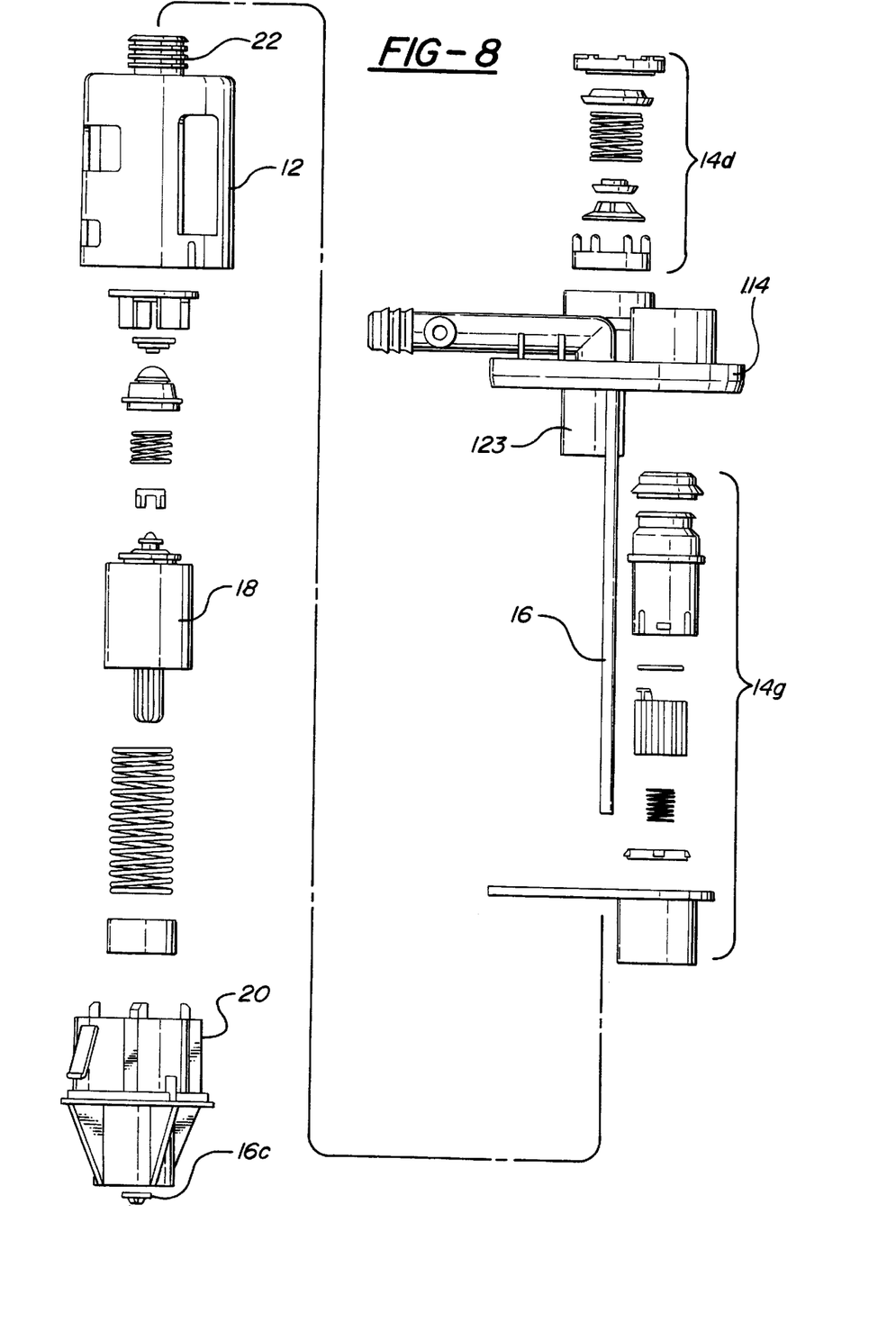
FIG. 8 is an exploded assembly view of the components illustrated in side section in FIG. 7.

FIG. 8 is an exploded assembly view of the valve assembly components illustrated in FIGS. 5–7. The assembly is similar to that illustrated in FIG. 4 for the "short" version, except for the changes to the length of certain components described above, and an optional additional rollover valve assembly 14g of a known type manufactured by G.T. Products in Ann Arbor, Mich.

Referring now to FIGS. 13–16, an alternate embodiment of the present invention is illustrated with a different longitudinal connector arrangement. In FIGS. 13–16, all of the parts are generally the same as illustrated above for both the "short" and "long" versions of the valve assembly, but connector pins 16 have been replaced with a molded plastic connector 116. Connector 116 is preferably formed from a creep-resistant plastic material, for example, from a nylon similar to that used in the main valve body 12, and comprises two or more longitudinal sets of legs which slide over mating locking tabs formed integrally with the sidewall of the main valve body. Connector legs 116, like connectors 16, provide a longitudinal, sacrificial side-impact protection function for the sealed vent outlet interface between the main valve body 12 and cover 14. The illustrated connector legs are designed for plastic welding to the main body after being positioned for the desired fuel shutoff level. They can also be configured to provide a longitudinal locking function, although the legs illustrated in FIGS. 13–16 engage tabs 112 in a simple sliding friction fit as best illustrated by the open ends of the legs 116 in FIG. 16, and by the cross section view of FIG. 14. Legs 116 preferably include rounded guide ribs 116a which help align the legs with the edges of tabs 112 and maintain a secure frictional contact therebetween prior to welding.

Like the connector pins 16 of FIGS. 1–12, plastic locking legs 116 may, if formed from a suitable material, be made to a standard "long" length and be cut to length for short versions, or simply left in place with the excess protruding.

It will be understood by those skilled in the art that although a weldable-type top cover and a non-weldable valve body is currently the preferred embodiment, the invention lends itself to non-welded top cover applications, for example on metal fuel tanks. Other known types of connection between the top cover and the fuel tank include threaded cap types, bayonet types with grommet seals, and press-fit connections with rotated locking rings cooperating with detent ears in the tank opening.

The foregoing description of illustrated embodiments of the invention is not intended to be limiting beyond the scope of the appended claims. Accordingly, we claim:

1. A fuel level responsive vent valve assembly adaptable to a variety of different mounting requirements in vehicle fuel tanks, comprising:
   a standard valve body including a fuel-level responsive valve means and a standard vent outlet formed thereon;
   a top cover formed separately from the standard valve body and designed to be mated with the standard valve body and to mount the standard valve body to the fuel tank, the top cover having a vent outlet interface designed to be mated with the vent outlet on the standard valve body to form a sealed connection with the vent outlet, an upper surface having at least one external vapor venting port, and a lower surface including a standard preassembly interface; and
   longitudinal connector means formed separately from the standard valve body and the top cover for longitudinally locking the standard valve body to the top cover independently of the sealed connection at the vent outlet interface, the longitudinal connector means comprising a standard preassembly end for being preassembled to the standard preassembly interface on the top cover, and a standard assembly end for assembly to a mating assembly portion on the standard valve body in a longitudinal sliding fit.

2. The vent valve assembly of claim 1, wherein the longitudinal connector means comprises a pin having a length longer than the standard valve body such that the standard assembly end of the pins extends below the standard valve body.

3. The vent valve assembly of claim 2, wherein the mating assembly portion on the standard valve body comprises a longitudinal channel for receiving the longitudinal connector pin, the channel having an opening in a lower end of the standard valve body from which the standard assembly end of the connector pin protrudes when the standard valve body is assembled to the top cover, and further includes mechanical means for longitudinally locking the standard valve body to the connector pin.

4. The vent valve assembly of claim 3, wherein the means for locking the standard valve body and the connector pin is adapted to be secured to the protruding standard assembly end of the connector pin.

5. The vent valve assembly of claim 1, wherein the longitudinal connector means comprises an intermediate plastic body comprising a base portion mating with the standard preassembly interface on the lower surface of the top cover, and integral longitudinal connector legs extending downwardly from the base to slide over a portion of the standard valve body.

6. The vent valve assembly of claim 5, wherein the mating assembly portion on the standard valve body comprises an exterior molded portion adapted to receive the connector legs.

7. The vent valve assembly of claim 6, wherein the longitudinal connector legs comprise at least one pair of spaced, substantially parallel legs, and the mating assembly portion of the standard valve body comprises a longitudinal, T-shaped tab for receiving the spaced connector legs in a sliding friction fit.

8. The vent valve assembly of claim 7, wherein the connector legs are longitudinally secured to the standard valve body by welding.

9. The vent valve assembly of claim 1, wherein the top cover is formed from a plastic material designed to be welded to a plastic fuel tank, and the standard valve body is formed from a material which is non-weldable to the fuel tank.

10. The vent valve assembly of claim 1, wherein the fuel-level responsive valve means comprises a float with a two-stage closing valve mechanism comprising a primary valve element having a rounded central portion with a secondary venting passage formed therethrough, a lower, cup-shaped orifice plate, and an insert-molded resilient seal element between the rounded central portion and the orifice plate, the rounded central portion sized to fit within the vent outlet, and the resilient seal designed to form a seal with the periphery of the vent outlet, the primary valve element being spring biased away from the float within the limits of a circumferential valve cage, the fuel level responsive valve means further including a secondary valve element located below the primary valve element and within the cup-shaped orifice plate for limited longitudinal travel relative to the float between a closed position against a lower outlet of the secondary venting passage formed in the primary valve element, and an open position away from the secondary venting passage.

11. The vent valve assembly of claim 10, wherein the secondary valve element located between the primary valve element and the float prevents the primary valve element from contacting the float when forced downwardly within the valve cage against its spring-bias, thereby maintaining a vapor venting clearance around a lower edge of the cup-shaped orifice plate.

12. A fuel level responsive vent valve assembly adaptable to a variety of different mounting requirements in vehicle fuel tanks, comprising:
   a standard valve body formed from a non-weldable, creep-resistant plastic, the standard valve body including a fuel-level responsive valve means and an exterior vent outlet portion;
   a weldable top cover formed separately from the standard valve body having a lower surface with a vent outlet interface portion for mating with the vent outlet on the standard valve body in a sealed connection, the lower surface of the top cover further including a standard preassembly interface comprising two longitudinal blind bores extending from the lower surface upwardly into the top cover, the weldable top cover being selected from a group consisting of a first top cover having a vent outlet interface portion of a first length, and a second top cover having a vent outlet interface portion of a second greater length;
   a plurality of separately formed longitudinal connector pins having a standard preassembly ends for insertion into the blind bores in the top cover such that the pins become longitudinally locked to the top cover, the connector pins further including standard assembly ends for insertion into mating channels formed in the standard valve body, the connector pins having a length such that the standard assembly ends of the pins protrude from a lower portion of the standard valve body; and
   longitudinal lock means for engaging the protruding assembly ends of the connector pins to longitudinally lock the standard valve body to the pins.

13. A fuel level responsive vent valve assembly capable of being adapted to a variety of different mounting requirements in vehicle fuel tanks, comprising:
   a standard valve body including a fuel level responsive valve means, an exterior vent outlet portion at an upper end, and means formed on the standard valve body for receiving a longitudinal connector;
   a non-standard weldable top cover including a vent outlet interface portion adapted to be mated in a sealing connection with the vent outlet portion on the standard valve body, and a lower surface with a standard preassembly interface for receiving a separately formed longitudinal connector;
   longitudinal connector means formed separately from the standard valve body and the top cover for longitudinally locking the standard valve body to the top cover independently of the sealed connection between the vent outlet interface and the vent outlet, the longitudinal connector means comprising a standard preassembly end for preassembly with the standard preassembly interface on the top cover, and a standard assembly end for assembly to the mating assembly portion on the valve body, the standard assembly end having a length greater than the length of the standard valve body.

* * * * *

UNITED STATES PATENT AND TRADEMARK OFFICE
CERTIFICATE OF CORRECTION

PATENT NO : 5,960,816
DATED : October 5, 1999
INVENTOR(S): Mills et al.

It is certified that error appears in the above-identified patent and that said Letters Patent is hereby corrected as shown below:

Column 8, line 8, delete "means" and after "and" insert --having--.

Column 8, line 15, after "upper surface" insert --of the top cover--.

Column 8, line 16, after "lower surface" insert --of the top cover--.

Column 8, line 18, before "longitudinal" insert --a-- and after "connector" delete "means".

Column 8, line 19, before "the top cover" insert --from-- and after "cover" delete "for" and insert --and designed to--.

Column 8, line 20, delete "locking" and insert --lock--.

Column 8, line 21, after "connection" insert --with the vent outlet--.

Column 8, line 22, delete "means".

Column 8, line 23, after "end" delete "for being" and insert --designed to be--.

Column 8, line 25, after "end" delete "for assembly" and insert --designed to be assembled--.

Column 8, line 29, after "connector" delete "means".

Column 8, line 31, delete "pins" and insert --pin--.

Column 8, line 39, after "includes" insert --a--.

Column 8, line 40, delete "means" and insert --fastener--.

UNITED STATES PATENT AND TRADEMARK OFFICE
CERTIFICATE OF CORRECTION

PATENT NO : 5,960,816
DATED : October 5, 1999
INVENTOR(S): Mills et al.

It is certified that error appears in the above-identified patent and that said Letters Patent is hereby corrected as shown below:

Column 8, line 42, delete "means for locking the standard valve body and the connector pin" and insert --mechanical fastener--.

Column 8, line 47, after "connector" delete "means".

Column 8, line 48, delete "comprising" and insert --having--.

Column 8, line 50, before "integral" insert --having--.

Column 8, line 51, after "base" insert --portion--.

Column 8, line 61, delete "for receiving" and insert --adapted to receive--.

Column 9, line 5, delete "means".

Column 9, line 16, delete "means".

Column 9, line 35, delete "means".

Column 9, line 36, delete "portion".

Column 9, line 38, after "body" insert --and--.

Column 9, line 39, replace "for mating" with --designed to mate--, and before "vent" insert --exterior--.

Column 10, line 6, after "having" delete "a" and replace "for insertion" with --adapted to be inserted--.

UNITED STATES PATENT AND TRADEMARK OFFICE
CERTIFICATE OF CORRECTION

PATENT NO : 5,960,816
DATED : October 5, 1999
INVENTOR(S): Mills et al.

It is certified that error appears in the above-identified patent and that said Letters Patent is hereby corrected as shown below:

Column 10, line 7, before "pins" insert --connector--.

Column 10, line 10, delete "for insertion" and insert --adapted to be inserted--.

Column 10, line 17, before "pins" insert --connector--.

Column 10, line 22, delete "means".

Column 10, line 23, after "end" insert --of the standard valve body-- and replace "means formed on" with --a portion of--.

Column 10, lines 23-24, delete "for receiving" and insert --adapted to receive--.

Column 10, line 26, delete "sealing" and insert --sealed--.

Column 10, line 28, after "and" insert --including--.

Column 10, line 29, delete "for receiving" and insert --adapted to receive--.

Column 10, line 31, before "longitudinal" insert --a-- and delete "means".

Column 10, line 32, delete "for" and insert --, the longitudinal connector being adapted to--.

Column 10, line 33, delete "locking" and insert --lock--.

UNITED STATES PATENT AND TRADEMARK OFFICE
CERTIFICATE OF CORRECTION

PATENT NO. : 5,960,816
DATED : October 5, 1999
INVENTOR(S) : Mills et al.

It is certified that error appears in the above-identified patent and that said Letters Patent is hereby corrected as shown below:

Column 10, line 35, after "vent outlet" (second occurrence) insert --portion--.

Column 10, line 36, delete "means".

Signed and Sealed this

Eleventh Day of April, 2000

Attest:

Attesting Officer

Q. TODD DICKINSON
Director of Patents and Trademarks